United States Patent [19]

Fujiki

[11] 4,383,000

[45] May 10, 1983

[54] MAGNETIC RECORDING MEDIUM

[75] Inventor: Kuniharu Fujiki, Yokohama, Japan

[73] Assignee: Victor Company of Japan, Limited, Yokohama, Japan

[21] Appl. No.: 223,087

[22] Filed: Jan. 7, 1981

[30] Foreign Application Priority Data

Jan. 11, 1980 [JP] Japan ................................. 55-1354

[51] Int. Cl.³ ............................................. B32B 27/30
[52] U.S. Cl. ..................................... 428/522; 428/695; 428/900
[58] Field of Search .................................. 427/177–132, 427/48; 428/695, 900, 522; 252/62.54

[56] References Cited

U.S. PATENT DOCUMENTS 4,172,176 10/1979 Tanaka et al. .................. 428/695 X

FOREIGN PATENT DOCUMENTS 2535448 2/1977 Fed. Rep. of Germany .

Primary Examiner—Bernard D. Pianalto
Attorney, Agent, or Firm—Lowe, King, Price & Becker

[57] ABSTRACT

A magnetic recording medium which comprises a support and a magnetic layer formed on the support which is comprised of a magnetic powder dispersed in a binder and containing a lubricant. The lubricant contains at least as ester of a linear aliphatic acid having 14–18 carbon atoms and an alcohol of the general formula, $(CH_3)_2CH-(CH_2)_n-OH$ in which n is an integer of from 1 to 5. Preferably, an ester of a linear aliphatic acid having 14–18 carbon atoms and an alcohol of the formula, $CH_3-(CH_2)_m-CH_2OH$, in which m is an integer of from 2 to 4 is contained.

6 Claims, 1 Drawing Figure

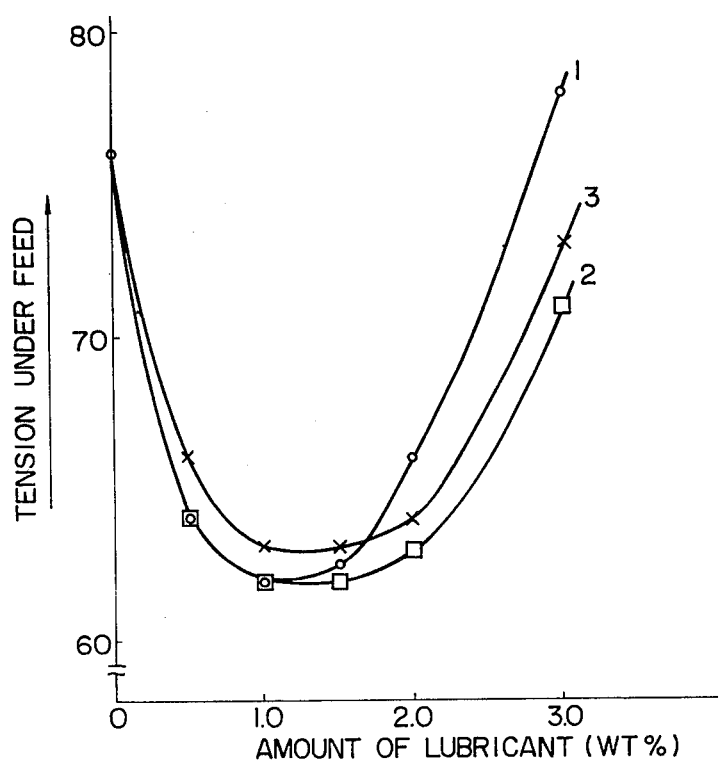

MAGNETIC RECORDING MEDIUM

BACKGROUND OF THE INVENTION

1. Field of the Invention

This invention relates to magnetic recording media and more particularly, to an improvement in the magnetic recording layer of media such as used in video tape recorders.

2. Description of the Prior Art

In recent years, there have been placed on the market video tape recorders of the long duration film recording type. The recorders of this type are characterized by a narrow width of magnetic heat so as to make a high recording density of the magnetic recording tape, thus imposing a great load or burden on the magnetic tape.

On the other hand, home video tape recorders have recently come into wide use, and small-size, portable video tape recorders are increasing in number. The recording and reproducing system of these apparatus is a so-called helical scan system using rotary magnetic heads by which a still picture can be reproduced. In the helical scan system, when a pause mechanism is operated on recording or a still picture is reproduced, the magnetic head alone is allowed to rotate without feeding the magnetic tape, so that the magnetic tape is repeatedly scanned on the same portion. The portable video tape recorder of the just-mentioned type is often used under high temperature and high humidity conditions or at a very low temperature in the open. Known magnetic recording tapes are rather unsatisfactory for use under these environmental or climatic conditions for still picture-reproducing or long-duration reproducing purposes. For instance, when typical known magnetic recording tapes which are obtained by applying onto a polyester film or the like magnetic paints, which comprise magnetic powders, binders, carbon black and lubricants such as choresterin butyrate, silicone, graphite and molybdenum disulfide, are subjected to long-duration reproduction or still picture reproduction under high or low temperature conditions, there are encountered problems such as blooming and exudation of the lubricant, head clogging, and abrasions produced on the tape coupled with rather poor magnetic characteristics.

SUMMARY OF THE INVENTION

It is an object of the invention to provide magnetic recording media which overcome the disadvantages of the prior art media and which can be conveniently used even under severe temperature and humidity conditions.

It is another object of the invention to provide magnetic recording media which show an excellent wear resistance and can thus run smoothly in operation and which minimize the likelihood of abrasive defects on the surface of the media on contact with magnetic recording and reproducing heads.

It is a further object of the invention to provide magnetic recording media which show excellent still picture reproduction and long-duration reproduction characteristics.

It is a still further object of the invention to provide magnetic recording media which make use of a lubricant of a specific type as an essential component.

The above objects can be achieved by a magnetic recording medium which comprises a support and a magnetic recording layer formed on the support and comprised of a magnetic powder dispersed in a binder and of a lubricant which contains at least an ester of a linear aliphatic acid having 14–18 carbon atoms, and an alcohol of the general formula, $(CH_3)_2CH(-CH_2-)_nOH$, in which n is an integer of from 1 to 5, the ester being contained in an amount of about 0.2 to 2.5% by weight of the magnetic powder.

In a preferred aspect, the lubricant further comprises, in addition to the ester of the type mentioned above, an ester of a linear aliphatic acid having 14–18 carbon atoms and an alcohol of the general formula, $CH_3(-CH_2-)_mCH_2OH$ in which m is an integer of from 2 to 4.

In this case, both esters are used in amounts ranging from about 0.2 to 2.5% by weight of the magnetic powder in the magnetic layer, respectively.

In either case, another type of lubricant may be optionally contained in the lubricant component provided that the first-mentioned ester or a combination of the first- and second-mentioned esters are essentially contained in the defined ranges or amounts.

BRIEF DESCRIPTION OF THE DRAWING

The sole FIGURE is a graph showing the tension exerted on a magnetic recording tape during its fast feed in relation to a variation in amount of lubricant for different magnetic recording tapes.

EMBODIMENTS OF THE INVENTION

As will be seen from the above, a prominent feature of the invention resides in use of a lubricant of a specific type incorporated in the magnetic layer of the medium.

In practice, it is essential that the lubricant contain at least an ester of a linear aliphatic acid having 14–18 carbon atoms and an alcohol of the general formula, $(CH_3)_2CH(-CH_2-)_nOH$ in which n is an integer of from 1 to 5. The alcohols of the formula include isobutyl alcohol, isoamyl alcohol, isohexyl alcohol, isoheptyl alcohol and isooctyl alcohol. Examples of the aliphatic acid include myristic acid, palmitic acid, stearic acid and mixtures thereof. Of these, stearic acid is preferable. Commercially available stearic acid generally contains 10–35% of palmitic acid and myristic acid and such stearic acid is used preferably. Typical examples of the ester are isobutyl stearate, isoamyl stearate, isohexyl stearate, isoheptyl stearate, isooctyl stearate and the like. These esters may be used singly or in combination. These esters are used in an amount of about 0.2 to 2.5% by weight of the magnetic powder. This is because less amounts do not develop any significant effect and larger amounts result in exudation of the lubricant. Preferably, the amount is in the range of about 1 to 1.5% by weight of the magnetic powder.

The magnetic recording medium using the esters mentioned above show an excellent still reproduction characteristic at low and high temperatures and an excellent travelling performance. In this connection, however, esters of the aliphatic acid and alcohols other than those defined hereinabove are inferior in properties such as still reproduction characteristics at high and low temperatures tension, under feed, and the like, to those used in the present invention as will be illustrated in examples and comparative examples appearing hereinafter. Presumably, this is due to differences in the type of the alkyl group of the alcohol used and the type and position of the side chain attached to the alkyl group.

The magnetic recording layer can be further improved by incorporating therein, in addition to the above-mentioned ester, an ester of an aliphatic acid having 14-18 carbon atoms and an alcohol of a different type represented by the formula $CH_3(-CH_2-)_mCH_2OH$, in which m is an integer of from 2 to 4. The aliphatic acids used herein are those mentioned hereinbefore.

That is, n-butyl stearate, n-heptyl stearate and n-hexyl stearate are preferably employed in combination with the first-mentioned ester. However, these esters are not so effective when used singly and should thus be used in combination with the first-mentioned esters. These esters are also used in an amount of about 0.2 to 2.5% by weight of the magnetic powder.

The lubricant to be used in the practice of the invention may optionally contain other types of lubricants provided that at least the first-mentioned ester is contained in the defined range. Examples of other type lubricant include oils and fats, silicones and the like. These lubricants are used generally in the range of below 1% by weight of the magnetic powder.

The magnetic powders and binders useful for the purpose of the invention may be any of those conventionally employed. For example, the magnetic powders include Fe, Fe-Co, $\gamma$-$Fe_2O_3$, Co-$\gamma$-$Fe_2O_3$, Co-$Fe_3O_4$ and the like. Preferable binders are two-component systems including polyisocyanates and vinyl chloride-vinyl alcohol copolymers, polyurethane elastomers, polyesters, polyols, phenoxy resins and the like.

The magnetic recording media using the lubricant suitable for the purpose of the invention can be fabricated by any known techniques. For instance, magnetic powders, binders and lubricants are mixed in organic solvents and the resulting magnetic paint is applied onto a support such as a polyester film or sheet, followed by drying and calendering to obtain a magnetic recording medium.

The present invention will be particularly described in the following examples, which should not be construed as limiting the invention thereto.

EXAMPLE 1

100 parts by weight of Co-containing $\gamma$-$Fe_2O_3$, 20 parts by weight of vinyl chloride-vinyl alcohol copolymer and polyurethane elastomer, 1 part by weight of lecithin, 1 part by weight of 2-ethylhexyl acid phosphate, 5 parts by weight of carbon black, 300 parts by weight of a mixed solvent of toluene, methyl ethyl ketone and methyl isobutyl ketone, and below 3 parts by weight of isobutyl stearate as a lubricant were mixed in a sand mill for about 20 hours, to which was further added 5 parts by weight of polyisocyanate to obtain a magnetic paint. The paint was applied onto an about 14.5$\mu$ thick polyester film, dried and the surface calendered. The thus calendered film was held at about 60° C. for 24 hours to allow a curing reaction to proceed, after which it was cut to about a ½ inch width to obtain a magnetic tape for video tape recorder.

EXAMPLE 2

Example 1 was repeated using isoamyl stearate ($C_{17}H_{35}COO-(CH_2)_2CH(CH_3)_2$) instead of isobutyl stearate.

EXAMPLE 3

Example 1 was repeated using isohexyl stearate ($C_{17}H_{35}COO-(CH_2)_3CH(CH_3)_2$) instead of isobutyl stearate.

EXAMPLES 4-9

Example 1 was repeated using, instead of isobutyl stearate, isoheptyl stearate ($C_{17}H_{35}COO(CH_2)_4CH(CH_3)_2$) (ex. 4), isooctyl stearate ($C_{17}H_{35}COO(CH_2)_5CH(CH_3)_2$) (ex. 5), a combination of isoamyl stearate and isoamyl palmitate in equal amounts (ex. 6), a combination of isoheptyl stearate and isoheptyl palmitate in equal amounts (ex. 7), a combination of isoamyl stearate and n-butyl stearate ($C_{17}H_{35}COOCH_2(CH_2)_2CH_3$) in equal amounts (ex. 8), and a combination of isoamyl stearate and n-hexyl stearate ($C_{17}H_{35}COOCH_2(CH_2)_4CH_3$) (ex. 9).

COMPARATIVE EXAMPLES 1-11

Example 1 was repeated using, instead of isobutyl stearate, isopropyl stearate (comp. ex. 1), isononyl stearate (comp. ex. 2), n-propyl stearate (comp. ex. 3), n-butyl stearate (comp. ex. 4), n-amyl stearate (comp. ex. 5), n-hexyl stearate (comp. ex. 6), n-heptyl stearate (comp. ex. 7), sec-butyl stearate (comp. ex. 8), 2-methylbutyl stearate (comp. ex. 9), 2-methylhexyl stearate (comp. ex. 10), and 2-ethylhexyl stearate (comp. ex. 11).

The magnetic tapes made in the examples and comparative examples were each set in a magnetic recording and reproducing apparatus to check the travelling performance when the tape was rapidly fed, the quality of picture and degree of abrasive defects on the tape surface at the time of still picture reproduction at temperatures ranging from $-10°$ C. to 40° C. (hereinafter referred to as wear-resistant test A). Also, the quality of picture and degree of abrasive defect on the tape surface at the time the magnetic tape sample was held in a pause condition in which the same recording track was repeatedly scanned for 10 minutes at room temperature and then still reproduced to observe a reproduced still picture (hereinafter referred to as wear-resistant test B). The results are shown in the Table below, where it will be noted that the travelling performance and the wear-resistant tests A and B are evaluated as follows.

Travelling performance:
1 ... Good.
2 ... Fair
3 ... Poor
4 ... Very poor

Wear-resistant Tests A and B:
1 ... No defect
2 ... No defect but a slight degree of abrasion caused by the magnetic head
3 ... Slight degree of defect
4 ... Fair degree of defect
5 ... Considerable degree of defect Judging collectively, tapes evaluated as 1 or 2 are usable but those evaluated as 3, 4 or 5 are unfit for use.

In test A, the still picture reproduction was continued for 2 hours unless otherwise indicated but those indicated in brackets, for example, as (100 min.) are evaluated after the reproduction has been continued for 100 minutes.

TABLE

| | Traveling Performance | Test A −10° C. | Test A 5° C. | Test A 20° C. | Test A 40° C. | Test B |
|---|---|---|---|---|---|---|
| Example 1 | 1 | 2 | 1 | 1 | 3 | 2 |
| 2 | 1 | 2 | 1 | 1 | 2 | 2 |
| 3 | 1 | 2 | 1 | 1 | 2 | 2 |
| 4 | 1 | 2 | 1 | 1 | 2 | 2 |
| 5 | 1 | 3 | 1 | 1 | 2 | 2 |
| 6 | 1 | 2 | 1 | 1 | 2 | 2 |
| 7 | 1 | 2 | 1 | 1 | 2 | 2 |
| 8 | 1 | 2 | 1 | 1 | 2 | 1 |
| 9 | 1 | 2 | 1 | 1 | 2 | 1 |
| Comparative Example 1 | 2 | 3 | 2 | 1 | 5(100 min) | 2 |
| 2 | 1 | 4 | 2 | 1 | 2 | 2 |
| 3 | 2 | 4(100 min) | 2 | 1 | 2 | 2 |
| 4 | 1 | 5(100 min) | 3 | 1 | 2 | 1 |
| 5 | 1 | 5(80 min) | 4 | 2 | 3 | 1 |
| 6 | 2 | 5(50 min) | 4 | 2 | 3 | 1 |
| 7 | 2 | 5(10 min) | 4 | 2 | 3 | 1 |
| 8 | 3 | 4(60 min) | 3 | 1 | 3 | 3 |
| 9 | 3 | 4(20 min) | 3 | 1 | 3 | 3 |
| 10 | 3 | 4(30 min) | 3 | 1 | 4 | 4 |
| 11 | 4 | 4(30 min) | 2 | 1 | 4 | 3 |

Note:
The amount of each lubricant is 1% by weight of the magnetic powder.

From these results, it will be found that use of esters of stearic acid or its combination with other aliphatic acids used in the present invention and alcohols of the general formula, $(CH_3)_2CH(CH_2)_nOH$, (in which n is an integer of from 1 to 5), as a lubricant for the magnetic recording tape is very effective in still picture reproduction at high and low temperatures. Especially, the lubricants of the invention are much better in low temperature characteristics than those used in the comparative examples.

Though similar types of stearates are used in both the examples and comparative examples, the results are completely different from each other. As illustrated hereinbefore, this is considered due to differences in the type of alkyl group of the alcohol component and the type and position of the side chain.

Further, it will be seen that the addition of esters of stearic acid and alcohols of the general formula, $CH_3(CH_2)_nCH_2OH$, (in which n is an integer of from 2 to 4), is effective in improving the quality of picture and reducing the degree of abrasive defects at the time of the repeated still picture reproduction. In addition, the results of Examples 6 to 7 reveal that ester lubricants other than stearates of the specific type of the invention may be also be used without involving any deterioration in the characteristic properties.

The media obtained in examples of the invention offered no problems of head clogging and blooming.

Then, the magnetic tapes of these examples and comparative examples were subjected to a measurement of tension under feed. The magnetic tapes of the present invention showed a similar tendency and were excellent in lubricating properties. The tension of some magnetic tapes is shown in the sole FIGURE in relation to an amount of lubricant, in which curve 1 is for a magnetic tape of Example 2, curve 2 is for that of Example 8, and curve 3 is for that of Comparative Example 4.

What is claimed is:

1. A magnetic recording medium comprising a support and a magnetic recording layer formed on said support, said magnetic recording layer comprising a magnetic powder dispersed in a binder and including a lubricant which contains at least an ester of an aliphatic acid having 14–18 carbon atoms and an alcohol of the general formula, $(CH_3)_2CH(-CH_2)-_nOH$, in which n is an integer of 1 to 5, said ester being contained in an amount of from about 0.2 to 2.5% by weight of said magnetic powder.

2. A magnetic recording medium according to claim 1, wherein said aliphatic acid is stearic acid.

3. A magnetic recording medium according to claim 1, wherein said aliphatic acid is a mixture of stearic acid, myristic acid and palmitic acid.

4. A magnetic recording medium according to claim 1, wherein said lubricant further comprises an ester of an aliphatic acid and an alcohol of the general formula, $CH_3-(CH_2)_m-CH_2OH$ in which m is an integer of from 2 to 4.

5. A magnetic recording medium according to claim 4, wherein the last-mentioned aliphatic acid is stearic acid or a mixture of stearic acid, myristic acid and palmitic acid.

6. A magnetic recording medium according to claim 4, wherein the last-mentioned ester is contained in an amount of from about 0.2 to 2.5% by weight of the magnetic powder.

* * * * *